Sept. 30, 1969  E. E. WUSCHKE  3,470,465
METHOD AND MEANS FOR MEASURING FLUID CONDUCTIVITY
INCLUDING A THREE ELECTRODE ARRANGEMENT
Filed April 21, 1966  2 Sheets-Sheet 1

Edgar E. Wuschke
INVENTOR.

BY Westell & Hanley

Sept. 30, 1969          E. E. WUSCHKE          3,470,465
METHOD AND MEANS FOR MEASURING FLUID CONDUCTIVITY
INCLUDING A THREE ELECTRODE ARRANGEMENT
Filed April 21, 1966          2 Sheets-Sheet 2

Edgar E. Wuschke
INVENTOR.

BY *Westell & Hanley*

3,470,465
METHOD AND MEANS FOR MEASURING FLUID
CONDUCTIVITY INCLUDING A THREE ELEC-
TRODE ARRANGEMENT
Edgar Edwin Wuschke, Pinawa, Manitoba, Canada, as-
signor to Atomic Energy of Canada Limited, Ottawa,
Ontario, Canada, a corporation of Canada
Filed Apr. 21, 1966, Ser. No. 544,281
Int. Cl. G01r 27/02, 11/44; H01g 7/00
U.S. Cl. 324—65                                      12 Claims

ABSTRACT OF THE DISCLOSURE

Conductivity of fluids with low conductance is measured by apparatus and a method for applying a potential to the fluid between first and second electrodes and measuring conduction between the first datum and a third electrode, while maintaining the third electrode at a potential near that of the second electrode while ensuring that insulating material contacting said first electrode and insulating material contacting said third electrode are spaced by said second electrode.

---

This invention relates to means and a method for measuring the conductivity of fluids.

The fluids measured may be liquid or gaseous.

Although the techniques of the invention will be applicable to fluids which are stationary, the invention will have, in a preferred form; particular application to fluids flowing past the measuring apparatus.

Although the techniques of the invention will be applicable to fluids of any temperature they are particularly applicable to fluids at high temperatures for example temperatures of the order of 400° C.

Although the techniques of the invention will be applicable to fluids having a wide range of conductivity, the invention is particularly applicable to extremely low conductivities of the orders of specific conductivities of from $10^{-7}$ and $10^{-12}$ mhos/cm.

With specific conductivities of such low value, it will be realized that many if not all of the insulations used have conductivities of the same or higher order, especially if such insulators must withstand high pressures. Therefore, while in consideration of conventional electrical circuits, the electrical conductivity of insulation between potentially different points in an electrical circuit may be ignored; this cannot be done, in this application since, where current may travel between potential terminals either through insulation or through the fluid to be measured, the amount travelling through such insulation will, in many applications, be greater than, or a material fraction of, the current through the fluid. Hence one of the prime objects of the apparatus and method here disclosed must be to eliminate from the measurements obtained, the effects of conduction through such insulation.

Prior devices for measuring the conductivity of fluids have used a Wheatstone bridge or a D.C. ohm meter. The accuracy of both techniques has been affected by the fact that leakage through the insulators separating electrical terminals affects the results, and by the fact that at high temperatures and pressures, the best known insulators have leakage conductance comparable to the conductance of the fluid between the electrodes whose conductivity is to be measured.

It is an object of this invention to provide means and a method of avoiding or minimizing the effects of such leakage.

In a preferred form of the invention, this is achieved by providing that an input potential is supplied between a first and second datum electrode while a current detector is connected between a measurement electrode and the second datum electrode, the current detector being so designed that its input potential is preferably substantially zero, but at least designed so that its input potential is very small relative to the potential between the first datum and measurement electrodes. Thus the effects of leakage on the measurement of current flow between the first and measurement electrodes are avoided since:

(a) Leakage through insulators between the first and second electrodes does not affect the measurement, which is dependent upon the current flow between the first and measurement electrodes relative to the potential therebetween; since there is used, a potential source applied between said first and second datum electrodes, of sufficient strength and constancy (although a varying signal is produced thereby) that the leakage between the first and second electrodes does not affect the potential difference between the first and measurement electrodes.

(b) Leakage through insulators between the second datum and measurement electrodes is eliminated, or substantially so, since the second and measurement electrodes are maintained at the same potential or at a potential difference very small, relative to the potential between the first and measurement electrodes.

(c) The three electrodes are so located relative to the insulation supporting them, that insulation leakage paths exist between the first and second datum electrodes and between the second datum and measurement electrodes. However conduction of any substance between the first and measurement electrodes is avoided by avoiding any solid material paths between the first datum and measurement electrode and preferably this is achieved by providing that any solid material path between the first datum and measurement electrodes is interrupted by material connected to said second datum potential.

The accuracy of prior D.C. techniques has further suffered due to D.C. potentials which have been found to exist in flowing fluids.

It is an object of this invention to provide means and a method where the use of a varying input potential to the flowing fluid, in combination with measuring apparatus designed to eliminate the D.C. component from the measured signal, removes from the conductivity measurements obtained, the effects of the D.C. potential created by the flowing fluid.

Futhermore, Wheatstone bridge measurements are substantially useless at low values of conductivity, due to the effects of the capacities of the measuring cell and connecting leads.

It is an object of this invention to provide for means and a method of measuring the conductivity of a fluid, using a varying potential, wherein capacitive charging effects of the electrodes and connections are substantially eliminated from the measurement by applying to the fluid, a varying potential having a half cycle length longer than the time required to charge such cell and leads and measuring conduction in the fluid after such charging has effectively taken place. To achieve this object the potential will, preferably remain at a substantially constant value for a period longer than the time required to substantially complete the charging of the electrodes and connections therefor and measuring such conduction in the fluid in that interval of the half cycle of such constant potential, after such charging has been substantially completed.

In drawings which illustrate a preferred embodiment of the invention:

Figure 1:
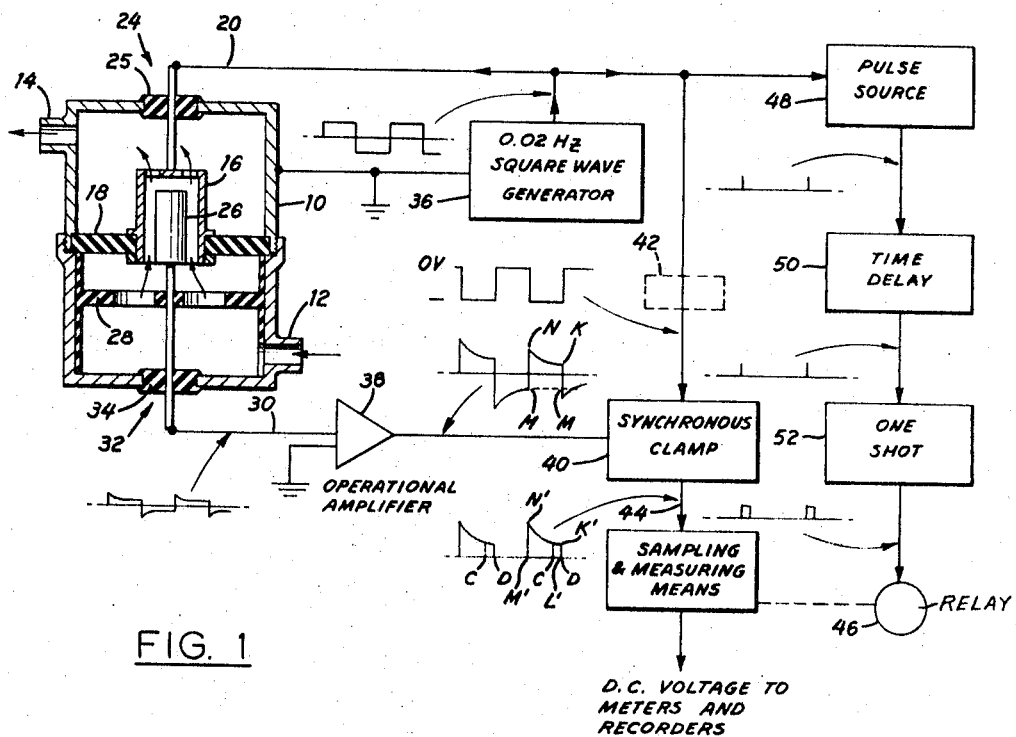
FIGURE 1 shows a drawing of a measuring cell for use with the invention and a block diagram of the means for energizing the cell and for measuring the results achieved therewith.

In FIGURE 1 is shown a chamber designed with conductors and insulators to effect measurements in accord with the invention. It is preferably a conducting cylinder 10 defining a first electrode with side, top and bottom walls with the side walls defining an inlet port 12 and outlet port 14, each such port being connected to a conduit not shown, for the fluid to be measured. It will be noted that, with the equipment defined, liquids or gases may be measured with equal facility.

Also it will be noted that flowing or stationary fluids may be measured. However with flowing fluids an additional advantage is achieved with the circuitry and methods provided, since the preferred method and circuitry used avoids the effects on the measurements obtained of D.C. potentials which are developed in some flowing fluids.

A second electrode 16 of hollow cylindrical form is mounted inside the container, and is supported, spaced from and preferably centered within the container walls by insulating supports 18 resting on suitable supports on the walls of the container.

A lead 20 connects the hollow second electrode to a potential source 36 to be discussed hereafter. Assuming the device is used for measuring fluids at high temperatures up to temperatures of the order of 400° C. and at pressures up to pressures of the order of 500 p.s.i., the lead 20 extends out of cell body 10 through an aperture 24 in the stainless steel body 10 which aperture will be sealed between the lead 20 and the body 10 by a suitable sealing device and electrical insulation such as a cylindrical high pressure seal 25.

The conducting cylinder 10 acts as the first electrode and is connected to a potential datum (here to ground).

A cylindrical third electrode 26 is mounted inside the cell by an insulating spacer 28 also supported on the chamber walls. A lead 30 electrically connects the third measuring electrode 26 to a measuring means to be described hereinafter. The lead 30 extends out of cell body 10 through an aperture 32 which aperture will be sealed and insulated in the same manner as lead 20 by a cylindrical high pressure seal 34.

The cell as above described will be arranged so that some and preferably all of the fluid will flow between the second and third electrodes 16 and 26. Thus the hollow cylindrical electrode 16 is provided with large apertures at its upper end so that fluid flowing in the open bottom of the cylindrical electrode 16 may flow out the top.

The insulator 18 supporting the hollow cylindrical electrode is preferably formed to shut off the flow of the fluid outside the hollow cylindrical electrode while the insulator 28 for supporting the central measuring electrode 26 is apertured below cylinder 16 to allow the fluid to flow through the hollow cylindrical electrode 16.

If desired the insulating spacer 28, supported from the chamber walls may be replaced by small insulators located between, and spacing cylinder 26 and cylinder 16. Such small insulators would of course be spaced to allow for the passage of fluid therebetween. The design shown in the drawings providing for support from the walls is preferable but more difficult of manufacture than the small insulating spacers just referred to.

A potential is applied to the fluid from between the hollow cylindrical second electrode 16 and the first electrode or cell body 10. The second electrode is connected to a potential datum, here ground and the cylindrical second electrode is connected to the potential source 36.

The potential source 36 is preferably a square wave generator designed and constructed to supply an alternating square wave. The square wave is preferred since it is, as will be seen hereafter, conveniently shaped for the measurement of conduction in the fluid during the part of each half cycle after electrode and connection capacitances have been charged.

The frequency of the square wave, must be therefore low enough to provide half cycles of this length. It has been found that to measure conductances of $10^{-12}$ mhos per centimeter the square wave frequency cannot be much higher than 1 or 2 cycles per minute (about .02 Hz. to .03 Hz.). On the other hand, much lower frequencies cause design problems in the electronic equipment for detection of conduction through the fluid.

The criteria given for measurements of conductances at $10^{-12}$ mhos per centimeter are not intended to suggest limits on the operating range for the instruments which may measure conductivities of as high a value as desired. On the other hand special equipment design beyond that herein disclosed would be required at conductances much lower than $10^{-12}$ mhos per centimeter.

Measurement of conductance between the second and third electrodes is achieved by connecting the detection and measuring equipment between the first and third electrodes (and it will be noted that the first electrode is preferably but not necessarily at ground potential).

Figure 2:
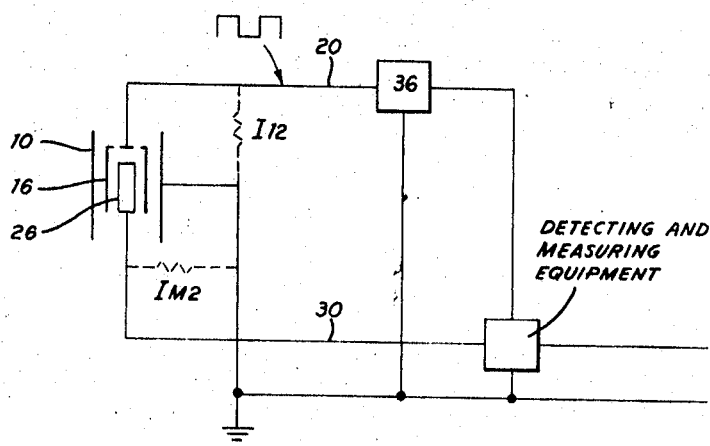
FIGURE 2 is a schematic indication of the electrical operation of the cell components.

Thus the measuring cell circuitry may be schematically represented as shown in FIGURE 2, by:

The alternating current voltage sources 36 connected between the first and second electrodes 16 and 10.

The detecting and measuring equipment: connected between the first and third electrodes, 26 and 10.

The insulation $I_{12}$ is shown as a dotted electrical resistance between the first and second electrodes 10 and 16. A similar insulation resistance $I_{M2}$ is shown between the third and first electrodes. It will be noted that such insulation must be considered to some extent as a conductor, since the conduction therethrough will, at fluid conductances of the order of $10^{-12}$ mhos per centimeter, be greater than the fluid conductances and in most applications of the invention insulation conductivity will be at least sufficient to materially affect the measurement of conduction through fluids with which they are in parallel.

It will be noted that leakage currents through the insulation between the first and second electrode terminals, do not affect the measurement of conduction between the second and third electrode terminals, as long as this leakage does not affect the potential of the applied signal, which may for all practical purposes be, and is, ensured by proper design of the source.

It will be noted that leakage currents through the insulation cannot travel between the second and third electrode terminals since the insulation and electrodes are so arranged that any such "insulation conduction" path must include the first electrode.

It will be noted that leakage can take place through the insulation between the third and first electrodes, bypassing the measuring path, and tending to affect the measurement. The serious effects of this on the conductivity measurement, are eliminated in the inventive construction, by providing means for detecting and measuring the current at the third electrode which uses a potential between the first and third electrodes which is preferably substantially zero (although measurable) and in any event is very small relative to the potential between the second and third.

In the preferred embodiment the detecting means is an operational amplifier 38 which, as is well known, operates on an input voltage, nearly, but not absolutely zero. Such operational amplifier is not discussed here in detail as it is well known but if further information is desired reference may be made to many standard text books including a book entitled "Introduction to Transistor Circuits" by E. H. Cooke—Yarborough 2nd Edition, published by Interscience Publishers Inc. of New York.

The amplified output of the operational amplifier 38, is therefore the amplified value of the current appearing between the second and third electrodes 16 and 26. This output as well as the input thereto, in addition to an amplitude varying as the conductivity of the fluid, contains at least one, and in a flowing fluid at least two unwanted components.

Firstly, during the early portion of each half cycle the output of the operational amplifier will contain a component which is a function of the capacitance of the measuring cell, the electrodes and the connections. Secondly, in flowing fluids, D.C. potentials are built up when low conductivity fluid flows by the electrodes and such potentials provide an unwanted D.C. component in the detected signal. One of the main functions of the equipment operating on the received output of the operational amplifier 38 is to eliminate from the conductivity measurements, the effects of the above two components.

The D.C. component in the detected signal is removed by a D.C. restorer or synchronous clamp 40 of well known design, connected to the output of operational amplifier 38.

The operation of the circuit is such that, in the absence of a gating signal, the output of the synchronous clamp 40 is a predetermined fixed potential, here zero potential, while during the presence of a gating signal, potentials appear at the output corresponding to changes in input waveform from the time of application of the gating signal. In the circuitry described, the gating signal is absent during the negative portion of the input to the synchronous clamp, and present during the positive moving and positive portion. In FIGURE 1 the positive portion M–N–K at the input of the synchronous clamp, which has a datum M (being the point in the wave form at which the wave starts to go positive and which varies in level) from time to time due to the D.C. components of the signal, appears at the output as a similar positive signal M'–N'–K' but with datum M' always at a fixed potential, here zero.

Figure 4:
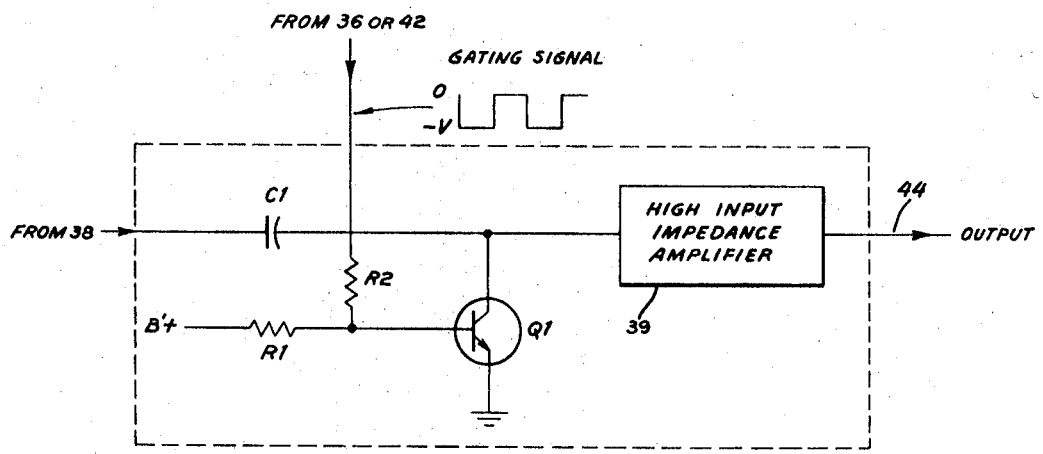

A suitable form of the circuit for the synchronous clamp is shown in FIGURE 4. As shown such D.C. restorer or synchronous clamp comprises a condenser CI connected between the operational amplifier 38 and a high input impedance amplifier 39. The design of amplifier 39 is well known and is such that little curent is required by its input. A transistor QI has its collector connected between condenser CI and amplifier 39, and its emitter connected to ground. The base of transistor QI is connected to a positive D.C. datum B'+ through a resistor RI. The square wave power source 36 (or time delay 42 if used), is connected between resistance RI and the base of QI. The output of amplifier 39 is connected to line 44.

In the absence of a gating signal the positive potential applied to resistor RI causes transistor QI to conduct. In this condition the potential difference between the collector and emitter of transistor QI is substantially zero, and the output is at reference (zero) potential. Changes in the input signal during this time, charge condenser CI to the potential difference between the signal and zero potential. It must be noted that the transistor can conduct either from collector to emitter or vice versa, so that zero potential is maintained for either positive going or negative going input signals.

A negative gating signal of sufficient amplitude causes transistor QI to become non-conducting. In this condition any changes in the input signal are transmitted by condenser CI to the input of a high input impedance amplifier of well known design. Since little current flows in the input of amplifier 39 due to its design the charge on CI remains substantially constant and any changes in the input signal to the synchronous clamp appear in amplified form at the output of the amplifier. It will be noted that one of the effects of the synchronous clamp 40, is to eliminate from the output, the effects of any D.C. component in the input signal to the clamp 40, since it is the positive swing from the negative steady state value which is measured regardless of the D.C. level of the input signal. The control pulse is supplied to the synchronous clamp 40 from the square wave power source 36. A time delay 42 shown in dotted form, may be inserted where needed to bring the pulses into synchronism with the positive portion of the input to the clamp.

It will be seen that the output of the synchronous clamp 40 (between the nulls corresponding to the negative half cycles) starts with a positive peak decaying after the positive charging of the electrodes and connections to a substantially steady state value in the time interval C–D at the end of the positive half cycle. Since the amplitude of the signal in the area C–D is a measure of the conductivity in the fluid, it is this portion which is measured. This is achieved through the circuit shown in FIGURE 3.

The output of the synchronous clamp 40 is applied to a line 44 interrupted by the normally open contacts 46–1 of a relay 46. The relay contacts 46–1 are closed during the period C–D in every cycle, by the pulses supplied synchronously by the source of potential to the first and second terminals. In the preferred form of the invention the closing of the contacts 46–1 is controlled through the square wave source 36 which (as shown in FIGURE 1) is applied to a pulse source 48 which produces from the square wave form, pulses for excursions in one direction only of the square wave. The pulses are applied to a time delay 50 designed and constructed to provide pulses at a time corresponding to C, the start of the desired measurement interval of the output from the synchronous clamp 40. The pulses from time delay 50 are then applied to a one shot 52, which produces an output pulse of width corresponding to time interval C–D. Thus the output of one shot 52 is applied to the relay 46 to energize it to close contacts 46–1 during periods C–D.

Accordingly the signal appears on the side of contacts 46–1 remote from the synchronous clamp 40 over the period C–D, in each positive half cycle indicated in FIGURE 2. Such signal may be measured in any one of a number of ways directly and due to the elimination of the capacitive and D.C. effects, the signal is substantially proportional to the conductivity of the fluid and therefore an indication thereof.

Figure 3:
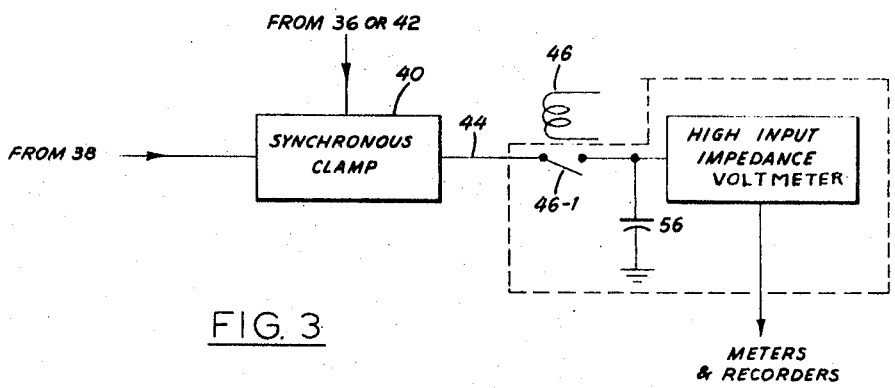
FIGURES 3 and 4 are detailed views of some of the measuring circuitry used.

A preferred method of measuring the strength of such signals is shown in FIGURE 3.

The output line from contacts 46–1 is connected to a condenser 56. A high input impedance voltmeter of well known design measures the voltage across condenser 56. During the time interval C–D (contacts 46–1 closed) condenser 56 is charged to a potential equal to the amplitude of the signal during time C–D. During the remaining part of a cycle (contacts 46–1 open) the charge on condenser 56 remains substantially constant. During the next cycle condenser 56 is again charged to the amplitude of the signal, and so on, so that the output of the voltmeter is a continuous record of the conductivity of the sample. The output of the voltmeter may be applied to a meter or other indicator which indicates the conductivity of the sample being measured.

I claim:

1. A device for measuring the electrical conductivity of a fluid, comprising in combination:
   means defining a fluid transfer vessel having an inlet and an outlet, said vessel comprising a first electrode;
   conduit means comprising a second electrode;
   first insulation means positioning said conduit means within said vessel to define at least a portion of a flow path from said inlet to said outlet;
   a centerbody comprising a third electrode; and
   second insulation means positioning said centerbody within and spaced from said conduit means, said insulation means serving to space said electrodes with said electrodes and insulation means arranged to direct fluid to flow through the chamber formed between said conduit means and said centerbody.

2. A device as defined in claim 1 wherein said electrodes and insulation means are arranged so that insulating material contacting said second electrode and insulating material contacting said third electrode are spaced by said first electrode.

3. A device as defined in claim 2 including:
means for applying a varying potential between said first and second electrodes.

4. A device as defined in claim 2 including:
means for applying a varying potential between said first and second electrodes;
means for maintaining the potential between said first and third electrodes small relative to the potential between said first and second electrodes; and
means for measuring current flow between said second and third electrodes.

5. A device as defined in claim 4 wherein said varying potential applying means is designed and constructed to apply a periodically varying wave signal between said first and second electrodes with said wave retaining a substantially constant amplitude for a predetermined interval in the period of said signal.

6. A device as defined in claim 5 wherein said varying potential applying means is designed and constructed to provide that said predetermined interval is longer than the time required for current resulting from said substantially constant amplitude to substantially charge said electrodes and their connections.

7. A method of measuring the conductivity of fluids with the device in claim 1 comprising the steps of:
applying a varying potential to the first and second electrodes;
maintaining the potential between said first and third electrodes small relative to the said applied potential; and
during such application and maintenance, measuring current flow between said second and third electrodes.

8. A method as claimed in claim 7 wherein the step of applying a varying potential is performed so that there is applied between said first and second electrodes a periodically varying potential wherein the potential retains a substantially constant amplitude for a predetermined interval in the period of said signal.

9. A method as claimed in claim 8 wherein the said predetermined interval is selected to be of a duration longer than the time required for current resulting from said substantially constant amplitude to substantially charge said electrodes and their connections with the added step of sampling said current flow during said interval and after said electrodes are substantially charged.

10. A method of measuring the conductivity of fluids wherein leakage paths exist in parallel with the fluid whose conductivity is to be measured:
comprising locating mutually spaced first, second and third electrodes in contact with said fluid with said second and third electrodes defining a fluid containing space therebetween and within said first electrode;
providing connections for said electrodes;
arranging said electrodes so that potential leakage paths between said second and said third electrode are intercepted by said first electrode;
applying a varying potential between said first and second electrodes;
during said application, maintaining the potential between said first and said third electrode small relative to the potential between said first and said second electrode;
during said application and maintenance, measuring current flow between said second and said third electrodes.

11. A method as claimed in claim 10 wherein the step of applying a varying potential is performed so that there is applied between said first and second electrodes a periodically varying potential signal wherein the potential retains a substantially constant amplitude for a predetermined interval in the period of said signal.

12. A method as claimed in claim 11 wherein the said predetermined interval is selected to be of a duration longer than the time required for current of said substantially constant amplitude to substantially charge said electrodes.

References Cited

UNITED STATES PATENTS

| | | | |
|---|---|---|---|
| 3,050,999 | 8/1962 | Edwards | 73—304 |
| 2,783,420 | 2/1957 | Thompson et al. | 324—61 XR |
| 3,096,478 | 7/1963 | Brown | 324—61 XR |
| 3,119,267 | 1/1964 | Bartky | 324—61 XR |

EDWARD E. KUBASIEWICZ, Primary Examiner

U.S. Cl. X.R.

317—246; 324—30